United States Patent
Kim et al.

(10) Patent No.: US 11,694,342 B2
(45) Date of Patent: Jul. 4, 2023

(54) APPARATUS AND METHOD FOR TRACKING MULTIPLE OBJECTS

(71) Applicant: POSTECH Research and Business Development Foundation, Pohang-si (KR)

(72) Inventors: Dai Jin Kim, Pohang-si (KR); Hye Min Lee, Changwon-si (KR)

(73) Assignee: POSTECH Research and Business Development Foundation, Pohang-si (KR)

( * ) Notice: Subject to any disclaimer, the term of this patent is extended or adjusted under 35 U.S.C. 154(b) by 407 days.

(21) Appl. No.: 17/037,399

(22) Filed: Sep. 29, 2020

(65) Prior Publication Data
US 2021/0183074 A1   Jun. 17, 2021

(30) Foreign Application Priority Data

Dec. 12, 2019   (KR) .......................... 10-2019-0165373

(51) Int. Cl.
*G06T 7/246*   (2017.01)
*G06N 3/08*    (2023.01)
(Continued)

(52) U.S. Cl.
CPC .............. *G06T 7/246* (2017.01); *G06F 18/22* (2023.01); *G06N 3/045* (2023.01); *G06N 3/08* (2013.01);
(Continued)

(58) Field of Classification Search
CPC ........... G06T 7/246; G06T 2207/20081; G06T 2207/20084; G06T 2207/10016; G06T 7/248; G06T 2207/30196; G06T 7/74; G06T 2207/30232; G06T 2207/30241; G06T 7/70; G06T 2207/20021;
(Continued)

(56) References Cited

U.S. PATENT DOCUMENTS 10,740,654 B2 *  8/2020  Habibian ............. G06V 30/194
10,776,926 B2 *  9/2020  Shrivastava ........... G06N 20/00
(Continued)

OTHER PUBLICATIONS

Bertinetto, et al., "Fully-Convolutional Siamese Networks for Object Tracking," Sep. 2016, retrieved from https://arxiv.org/pdf71606.09549.pdf, 16 pages.
(Continued)

*Primary Examiner* — Michael S Osinski
(74) *Attorney, Agent, or Firm* — Morgan, Lewis & Bockius LLP (57) ABSTRACT

Disclosed is a method of tracking multiple objects included in an image using a multi-object tracking apparatus including an integrated similarity neural network, the method including setting a tracking area in an input image, extracting at least one object candidate for a target object from the tracking area; extracting reference features for the target object, the object candidate, and the tracking area, selecting two of the target object, the object candidate, and the tracking area to evaluate similarity based on the reference features; allocating the object candidate to the target object on the basis of the evaluated similarity; and tracking the target object on the basis of a location of the allocated object candidate.

16 Claims, 6 Drawing Sheets

(51) Int. Cl.
  *G06F 18/22* (2023.01)
  *G06N 3/045* (2023.01)
  *G06V 10/764* (2022.01)
  *G06V 10/82* (2022.01)
  *G06V 20/52* (2022.01)
  *G06V 20/56* (2022.01)

(52) U.S. Cl.
  CPC ............ *G06V 10/764* (2022.01); *G06V 10/82* (2022.01); *G06V 20/52* (2022.01); *G06V 20/56* (2022.01); *G06T 2207/20081* (2013.01); *G06T 2207/20084* (2013.01)

(58) Field of Classification Search
  CPC . G06T 7/292; G06T 2210/12; G06T 2210/22; G06T 2207/30201; G06F 18/22; G06N 3/045; G06N 3/08; G06N 3/0454; G06N 20/00; G06V 10/764; G06V 10/82; G06V 20/52; G06V 20/56; G06V 20/40; G06V 20/41; G06V 10/25; G06V 10/454; G06V 10/62; G06V 20/46; G06V 2201/07; G06K 9/6215; G06K 9/6256; G06K 9/6267; G06K 9/6232; G06K 9/6262; G06K 9/6227
  See application file for complete search history.

(56) References Cited

U.S. PATENT DOCUMENTS

| | | | |
|---|---|---|---|
| 10,825,188 B1* | 11/2020 | Tan | G06K 9/6289 |
| 10,902,615 B2* | 1/2021 | Tao | G06T 7/277 |
| 11,074,698 B2* | 7/2021 | Shibuya | G06V 20/52 |
| 11,455,782 B2* | 9/2022 | Li | G06T 7/248 |
| 2017/0084045 A1* | 3/2017 | Hsu | G06V 10/44 |
| 2017/0270674 A1* | 9/2017 | Shrivastava | G06T 11/60 |
| 2019/0147602 A1* | 5/2019 | Tao | G06K 9/6267 |
| | | | 382/103 |
| 2019/0228266 A1* | 7/2019 | Habibian | G06N 3/0445 |
| 2020/0026954 A1* | 1/2020 | Rhodes | G06V 10/426 |
| 2020/0074185 A1* | 3/2020 | Rhodes | G06F 17/18 |
| 2020/0082549 A1* | 3/2020 | Dehghan | G06V 40/172 |
| 2020/0160538 A1* | 5/2020 | Daniel | G06T 7/248 |
| 2020/0193222 A1* | 6/2020 | Singh | G06N 3/0454 |
| 2020/0258241 A1* | 8/2020 | Liu | G06V 30/19173 |
| 2020/0265591 A1* | 8/2020 | Yang | G06T 7/223 |
| 2020/0327679 A1* | 10/2020 | Ji | G06T 7/97 |
| 2020/0364882 A1* | 11/2020 | Feng | G06T 7/70 |
| 2021/0019627 A1* | 1/2021 | Zhang | G06V 10/25 |
| 2021/0279890 A1* | 9/2021 | Mou | G06V 20/17 |
| 2021/0295534 A1* | 9/2021 | Cho | G06V 20/52 |
| 2021/0319234 A1* | 10/2021 | Li | H04N 7/183 |
| 2021/0374971 A1* | 12/2021 | Zhou | G06K 9/6215 |
| 2022/0122271 A1* | 4/2022 | Song | G01S 7/4802 |
| 2022/0180536 A1* | 6/2022 | Oami | G06T 7/246 |
| 2022/0189038 A1* | 6/2022 | Yamazaki | G06T 7/292 |
| 2022/0215560 A1* | 7/2022 | Ji | G06T 7/90 |
| 2022/0284691 A1* | 9/2022 | Chen | H04N 5/23238 |
| 2022/0406065 A1* | 12/2022 | Kang | G06T 7/292 |

OTHER PUBLICATIONS

Xu, et al., "Spatial-Temporal Relation Networks for Multi-Object Tracking," 2019, 11 pages.
Sun et al., "Deep Affinity Network for Multiple Object Tracking", Journal of Latex Class Files, vol. 13, No. 9, Sep. 2017, pp. 1-15.

* cited by examiner

APPARATUS AND METHOD FOR TRACKING MULTIPLE OBJECTS

CROSS-REFERENCE TO RELATED APPLICATION

This application claims priority to Korean Patent Application No. 2019-0165373 filed on Dec. 12, 2019 in the Korean Intellectual Property Office (KIPO), the entirety of which is hereby incorporated by reference for all purposes.

BACKGROUND

1. Technical Field

Example embodiments of the present invention relate in general to a method and apparatus for tracking multiple objects and more specifically to a method and apparatus for tracking multiple objects using an integrated similarity neural network.

2. Related Art

Computer vision and machine learning are fields that analyze images input from various imaging sensors to extract meaningful data and are utilized in various industrial fields such as user posture analysis, driverless vehicle lane detection, and user face recognition. In addition, recently, data sets for computer vision and machine learning have been released, and research has been actively conducted in research institutes and academia on the basis of the released data sets, thereby leading to many developments.

An object tracking technology is a key technology in computer vision that is widely used in various fields such as video surveillance, human-computer interaction, and autonomous driving. A method commonly used in the object tracking technology field is a tracking-by-detection approach. A core technology in the tracking-by-detection approach is a technology that evaluates similarity between objects. Therefore, appearance features, motion information, location information, and the like of objects are used to evaluate the similarity between the objects.

With the recent rapid development of convolutional neural networks, the accuracy of similarity evaluation between objects has been improved compared to the conventional similarity evaluation method based on hand-crafted features. Therefore, the accuracy of the similarity evaluation between objects is improved through robust features using the convolutional neural network feature, and thus a result of the detection is accurately allocated to an object being tracked in the tracking-by-detection approach, thereby improving multi-object tracking performance.

However, although the accuracy of the similarity evaluation between objects is improved by using the convolutional neural network feature, the multi-object tracking technology has other problems such as irregular motion of images, an incorrect detection result, and obstruction due to obstacles.

When a target object is not detected or when an incorrect object is detected, the accuracy of tracking is degraded regardless of the results of similarity evaluation between objects. To compensate for this limitation, a multi-object tracking algorithm, which uses a single object tracking algorithm that searches the perimeter of an object and finds the location of the object regardless of the detection result, has been proposed.

However, the single object tracking algorithm is specialized in distinguishing a corresponding object from the surrounding background, and the multi-object tracking algorithm is specialized in distinguishing an object from other objects. Thus, when the single object tracking algorithm is directly applied to the multi-object tracking algorithm, identification switching may occur frequently, and the algorithms for single-tracking and multi-tracking should be trained separately.

SUMMARY

Accordingly, example embodiments of the present invention are provided to substantially obviate one or more problems due to limitations and disadvantages of the related art.

Example embodiments of the present invention provide an integrated similarity neural network capable of performing both of similarity evaluation and object tracking.

In some example embodiments, a method of tracking multiple objects included in an image using a multi-object tracking apparatus including an integrated similarity neural network includes setting a tracking area in an input image, extracting at least one object candidate for a target object from the tracking area, extracting reference features for the target object, the object candidate, and the tracking area, selecting two of the target object, the object candidate, and the tracking area to evaluate similarity based on the reference features, allocating the object candidate to the target object on the basis of the evaluated similarity, and tracking the target object on the basis of a location of the allocated object candidate.

Also, the extracting of the reference features for the target object, the object candidate, and the tracking area may include extracting the reference features on the basis of a Siamese neural network structure including a plurality of identical neural networks.

Also, the plurality of identical neural networks may include a convolutional neural network (CNN) performing a convolutional operation.

Also, the CNN may include a fully convolutional network structure.

Also, the selecting of two of the target object, the object candidate, and the tracking area to perform similarity on the basis of the reference features may include evaluating similarity between the target object and the object candidate and calculating a similarity value.

Also, the selecting of two of the target object, the object candidate, and the tracking area to evaluate similarity on the basis of the reference features may include evaluating similarity between the target object and the tracking area and calculating a similarity map and a phase value of an object.

Also, the allocating of the object candidate to the target object on the basis of the evaluated similarity may include forming a matrix on the basis of a similarity value obtained by evaluating the similarity between the target object and the object candidate and allocating the object candidate to the target object by applying the Hungarian algorithm to maximize the sum of similarity values in the matrix.

Also, the allocating of the object candidate to the target object on the basis of the evaluated similarity may include allocating, to the target object, an object candidate corresponding to an area exhibiting the highest similarity to the target object in the similarity map.

Also, the tracking of the target object on the basis of the location of the allocated object candidate may include tracking the object by applying a phase value of an object corresponding to the location of the allocated object candidate to the target object.

Also, the method may further include training the integrated similarity neural network by inputting the location of the target object, which is changed in consideration of the tracking result, to the integrated similarity neural network.

In other example embodiments, a multi-object tracking apparatus includes a processor and a memory configured to store at least one command executable by the processor, wherein the command may include a command to set a tracking area in an input image, a command to extract at least one object candidate for a target object from the tracking area, a command to extract reference features for the target object, the object candidate, and the tracking area, a command to select two of the target object, the object candidate, and the tracking area to evaluate similarity based on the reference features, a command to allocate the object candidate to the target object on the basis of the evaluated similarity, and a command to track the target object on the basis of a location of the allocated object candidate.

Also, the command to extract the reference features for the target object, the object candidate, and the tracking area may include a command to extract the reference features on the basis of a Siamese neural network structure including a plurality of identical neural networks.

Also, the plurality of identical neural networks may include a convolutional neural network (CNN) performing a convolutional operation.

Also, the CNN may include a fully convolutional network structure.

Also, the command to select two of the target object, the object candidate, and the tracking area to evaluate similarity on the basis of the reference features may include a command to evaluate similarity between the target object and the object candidate and calculate a similarity value.

Also, the command to select two of the target object, the object candidate, and the tracking area to evaluate similarity on the basis of the reference features may include a command to evaluate similarity between the target object and the tracking area and calculate a similarity map and a phase value of an object.

Also, the command to allocate the object candidate to the target object on the basis of the evaluated similarity may include a command to form a matrix on the basis of a similarity value obtained by evaluating the similarity between the target object and the object candidate and a command to allocate the object candidate to the target object by applying the Hungarian algorithm to maximize the sum of similarity values in the matrix.

Also, the command to allocate the object candidate to the target object on the basis of the evaluated similarity may include a command to allocate, to the target object, an object candidate corresponding to an area exhibiting the highest similarity to the target object in the similarity map.

Also, the command to track the target object on the basis of the location of the allocated object candidate may include a command to track the target object by applying a phase value of an object corresponding to the location of the allocated object candidate to the target object.

Also, the command may further include a command to train an integrated similarity neural network by inputting a location of the target object, which is changed in consideration of a result of the tracking, to the integrated similarity neural network.

BRIEF DESCRIPTION OF DRAWINGS

Example embodiments of the present invention will become more apparent by describing example embodiments of the present invention in detail with reference to the accompanying drawings, in which.

DESCRIPTION OF EXAMPLE EMBODIMENTS

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. In describing each drawing, like reference numerals are used for like elements.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the invention. As used herein, the singular forms "a," "an," and "one" are intended to include the plural forms as well, unless the context clearly indicates otherwise. It will be further understood that the terms "comprises," "comprising," "includes," and/or "including" when used herein, specify the presence of stated features, integers, steps, operations, elements, components, and/or combinations thereof but do not preclude the presence or addition of one or more other features, integers, steps, operations, elements, components, and/or combinations thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Preferred embodiments of the present invention will be described below in more detail with reference to the accompanying drawings.

Figure 1:
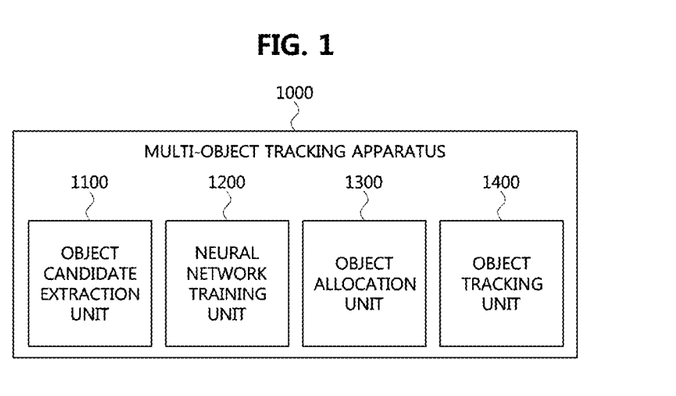
FIG. 1 is a block diagram of a multi-object tracking apparatus according to an embodiment of the present invention.

FIG. 1 is a block diagram of a multi-object tracking apparatus according to an embodiment of the present invention.

Referring to FIG. 1, a multi-object tracking apparatus 1000 according to an embodiment of the present invention may include an object candidate extraction unit 1100, a neural network training unit 1200, an object allocation unit 1300, and an object tracking unit 1400.

Here, the object candidate extraction unit 1100 may set a tracking area, which is to be tracked, on the basis of an input image and may extract and classify an object candidate which is for a target object and which is present in the tracking area.

Also, the neural network training unit 1200 may receive an object candidate of the current frame and information on an object in a preceding frame as an input and may output a result of similarity evaluation for pairs of objects and candidates.

Also, the neural network training unit 1200 may reflect the latest update of an object and then resume tracking of the object along a tracking trajectory along which the tracking has been performed, thereby improving the tracking trajectory.

Also, the object allocation unit 1300 may allocate object candidates to the target object by comprehensively considering a similarity evaluation result between the tracking area and the target object extracted by the neural network training unit 1200 and a similarity evaluation result between the object candidate and the target object.

Here, the object allocation unit 1300 may form a matrix on the basis of a similarity value obtained by evaluating similarity between the object candidate and the target object extracted by the neural network training unit 1200.

Also, the object allocation unit 1300 may allocate the object candidate to the target object by applying the Hungarian algorithm to maximize the sum of similarity values in the matrix.

Here, the object allocation unit 1300 may update the object by applying the Hungarian algorithm to allocate the object candidate to the target object.

Also, the object tracking unit 1400 may track the target object on the basis of the location of the allocated object candidate. Here, the target object may be tracked by applying a phase value of an object corresponding to the location of the allocated object candidate to the target object.

Figure 2:
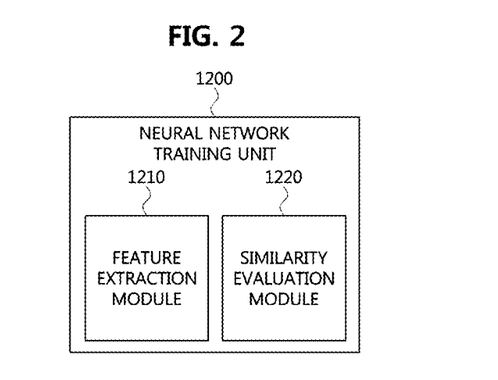
FIG. 2 is a detailed block diagram of a neural network training unit according to an embodiment of the present invention.

FIG. 2 is a detailed block diagram of a neural network training unit according to an embodiment of the present invention.

Referring to FIG. 2, the neural network training unit 1200 may include a feature extraction module 1210 and a similarity evaluation module 1220.

Here, the feature extraction module 1210 may extract a reference feature optimized for evaluating similarity between objects on the basis of a Siamese neural network structure including a plurality of identical neural networks. Also, the Siamese neural network structure may share identical result values for all the inputs.

Here, the reference feature for similarity evaluation extracted from the target object may be stored as a template.

Also, the similarity evaluation module 1220 may additionally perform a convolution operation on the feature extracted by the feature extraction module 1210 to convert an appearance feature of the target object into a template and then may evaluate similarity for the template.

Here, the convolution operation may be performed by a convolutional neural network (CNN).

Also, the CNN may include a fully convolutional network structure. Accordingly, the feature extraction module 1210 may extract features through a convolutional neural network having the fully convolutional network structure regardless of the size of an input image.

Also, the similarity evaluation module 1220 may apply a correlation operation to the tracking area and the object candidate to evaluate similarity. Accordingly, since the correlation operation is applied to the tracking area and the object candidate, a similarity value derived from the tracking area and a similarity value derived from the object candidate are compatible with each other. Therefore, even if the detected object candidate does not include the target object, the target object can be tracked by performing single object tracking.

Figure 3:
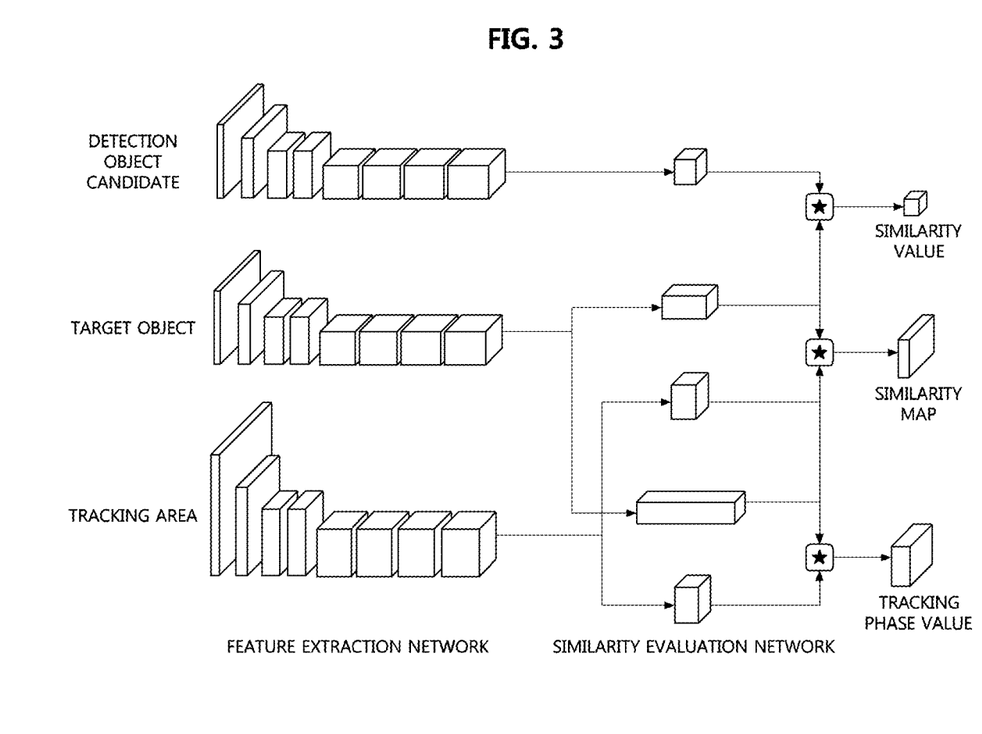
FIG. 3 is a conceptual view showing a training method using a neural network training unit according to an embodiment of the present invention.

FIG. 3 is a conceptual view showing a training method using a neural network training unit according to an embodiment of the present invention.

Referring to FIG. 3, the feature extraction module 1210 of the neural network training unit according to an embodiment of the present invention may extract features of an object candidate, a target object, and a tracking area.

Here, the object candidate and the target object may be adjusted to the same image size and then input to the similarity evaluation module 1220, and the tracking area may be doubled and then input to the similarity evaluation module 1220.

Also, the feature extracted from the target object may be stored as a template for similarity evaluation and divided into a reference feature value for performing a convolution operation and similarity evaluation and a reference feature value for calculating a tracking phase change value.

Also, the similarity evaluation module 1220 may output a similarity map and a tracking phase value through a convolutional operation of the templates of the target object and the feature extracted from the tracking area by using the feature extracted from the tracking area.

Here, the similarity map and the tracking phase value are for tracking a single object in the integrated similarity neural network, and the location of the target object in a following frame may be predicted by applying, to the target object, a tracking phase corresponding to the highest result value among the result values of the similarity map.

Also, the similarity evaluation module 1220 may perform a convolutional operation on the template of the target object with respect to object candidates and may output a single similarity value for each object candidate.

Finally, the object tracking may be performed by moving the target object to the location of the object allocated to the target object in comprehensive consideration of the highest value in the similarity map and the similarity values obtained from the object candidates.

Here, the object allocation unit 1300 may update the object by allocating an object candidate to the target object by applying the Hungarian algorithm, and the neural network training unit 1200 may reflect the latest update of the object and then resume tracking of the object along a tracking trajectory along which the tracking has been performed, thereby improving the tracking trajectory.

Figure 4:
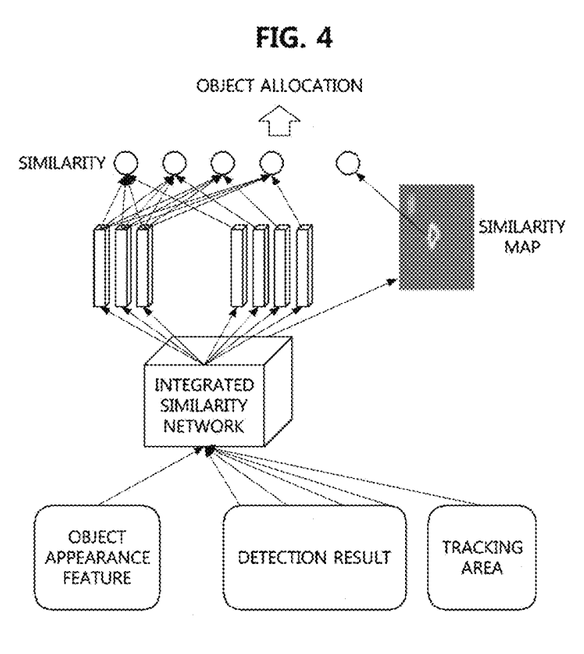
FIG. 4 is a conceptual view illustrating a method of performing both of single object tracking and similarity evaluation.

FIG. 4 is a conceptual view illustrating a method of performing both of single object tracking and similarity evaluation.

Typically, a similarity evaluation module for similarity evaluation receives an object candidate and a target object as an input and outputs a similarity evaluation result. Also, typically, a result of single object tracking plays a role of adding an undetected object candidate independently of similarity evaluation performed by the similarity evaluation module.

Referring to FIG. 4, by receiving the tracking area as well as the object candidate and the target object as an input, the integrated similarity neural network may also perform single object tracking on an object that is not detected during the similarity evaluation process and naturally add the object as a candidate.

Accordingly, according to the multi-object tracking method according to an embodiment of the present invention, the similarity evaluation is performed on the tracking area, and the similarity map is derived as a result value. In this case, an object candidate corresponding to a tracking area with the highest similarity may be allocated to the target object.

Figure 5:
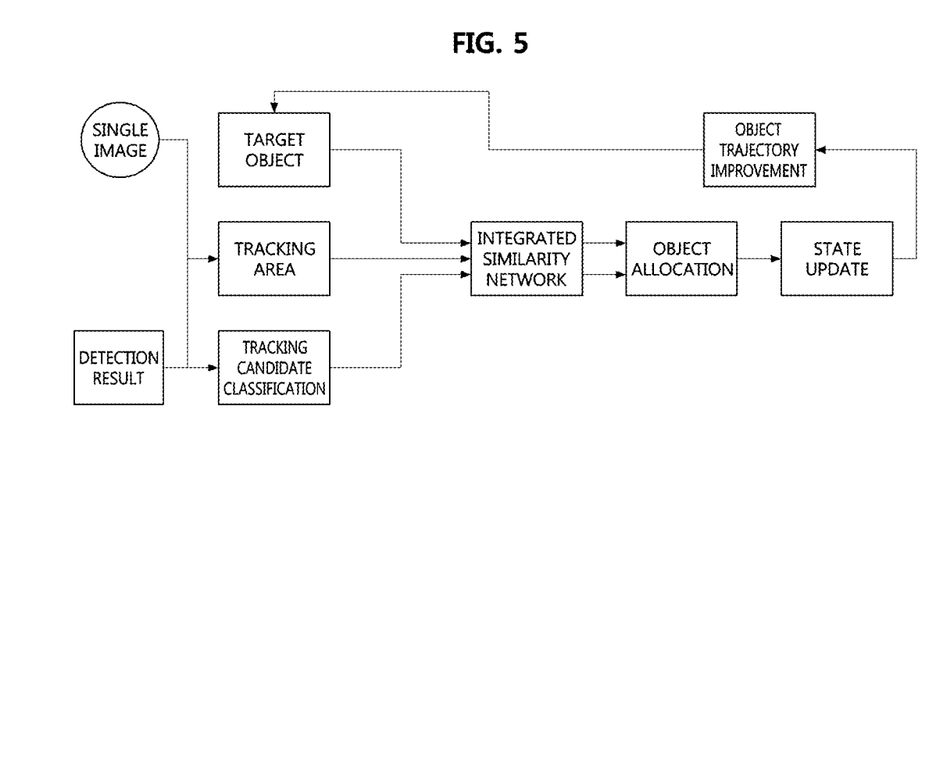
FIG. 5 is a flowchart illustrating a multi-object tracking method according to an embodiment of the present invention.

FIG. 5 is a flowchart illustrating a multi-object tracking method according to an embodiment of the present invention.

Referring to FIG. 5, the multi-object tracking method according to an embodiment of the present invention may include setting a tracking area in an input image and extracting at least one object candidate of a target object in the targeting area.

Here, an integrated similarity neural network may output similarity evaluation results between all the objects and their candidates by using object information in a preceding frame and an object candidate in the current frame. Also, the integrated similarity neural network may extract a feature of an object or perform similarity evaluation.

Here, when feature extraction is performed, the integrated similarity neural network may extract a feature optimized for evaluating similarity between objects using a Siamese neural network structure. Also, the integrated similarity neural network may share identical result values for all the inputs.

Also, when similarity evaluation is performed, the integrated similarity neural network may additionally perform a convolution operation on the extracted feature, convert the appearance of the target object into a template, and apply a correlation operation on the target object, the tracking area, and the object candidate to perform similarity evaluation.

Also, according to the present invention, an object candidate may be allocated to the target object in comprehensive consideration of a similarity evaluation result between the target object and the tracking area and a similarity evaluation result between the target object and the object candidate.

Here, according to the present invention, a matrix may be formed based on a similarity value obtained by evaluating similarity between the target object and the object candidate. Also, an object candidate may be allocated to the target object by applying the Hungarian algorithm to maximize the sum of similarity values in the matrix formed on the basis of the similarity value.

Also, the target object may be updated by applying a phase value of an object corresponding to the location of the allocated object candidate to the target object.

Finally, according to the present invention, it is possible to reflect the latest update of the object and then resume tracking of the object along a tracking trajectory along which the tracking has been performed, thereby improving the tracking trajectory.

Figure 6:
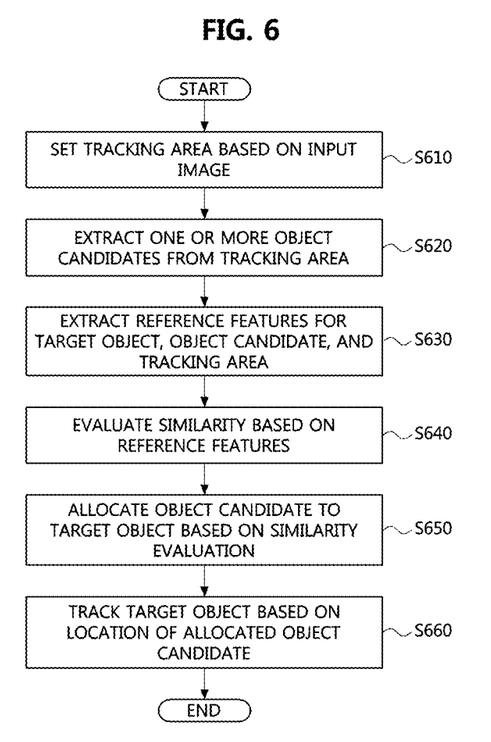
FIG. 6 is a flowchart illustrating operations of a multi-object tracking method according to an embodiment of the present invention.

FIG. 6 is a flowchart illustrating operations of a multi-object tracking method according to an embodiment of the present invention.

Referring to FIG. 6, the multi-object tracking method according to an embodiment of the present invention, which is a method of tracking multiple objects included in an image using a multi-object tracking apparatus including an integrated similarity neural network, may include setting a tracking area in an input image (S610).

Also, the multi-object tracking method may include extracting at least one object candidate for a target object candidate from the tracking area (S620).

Also, the multi-object tracking method may include extracting reference features for the target object, the object candidate, and the tracking area (S630).

Here, the extracting of reference features for the target object, the object candidate, and the tracking area may include extracting the reference features on the basis of a Siamese neural network structure including a plurality of identical neural networks.

Also, the plurality of identical neural networks may include a convolutional neural network (CNN) performing a convolutional operation.

Also, the CNN may include a fully convolutional network structure.

Also, the multi-object tracking method may include selecting two of the target object, the object candidate, and the tracking area and performing similarity evaluation on the basis of the reference features (S640).

Here, the selecting of two of the target object, the object candidate, and the tracking area to evaluate similarity on the basis of the reference features may include evaluating similarity between the target object and the object candidate and calculating a similarity value.

Also, the selecting of two of the target object, the object candidate, and the tracking area to evaluate similarity on the basis of the reference features may include evaluating similarity between the target object and the tracking area and calculating a similarity map and a phase value of an object.

Also, the multi-object tracking method may include allocating the object candidate to the target object on the basis of the evaluated similarity (S650).

Here, the allocating of the object candidate to the target object on the basis of the evaluated similarity may include forming a matrix on the basis of a similarity value obtained by evaluating the similarity between the target object and the object candidate and allocating the object candidate to the target object by applying the Hungarian algorithm to maximize the sum of similarity values in the matrix formed on the basis of the similarity value.

Also, the allocating of the object candidate to the target object on the basis of the evaluated similarity may include allocating, to the target object, an object candidate corresponding to an area exhibiting the highest similarity to the target object in the similarity map.

Also, the multi-object tracking method may include tracking the target object on the basis of the location of the allocated object candidate (S660).

Here, the tracking of the target object on the basis of the location of the allocated object candidate may include tracking the object by applying a phase value of an object corresponding to the location of the allocated object candidate to the target object.

Also, the multi-object tracking method according to an embodiment of the present invention may further include training the integrated similarity neural network by inputting the location of the target object, which is changed in consideration of the tracking result, to the integrated similarity neural network.

Figure 7:
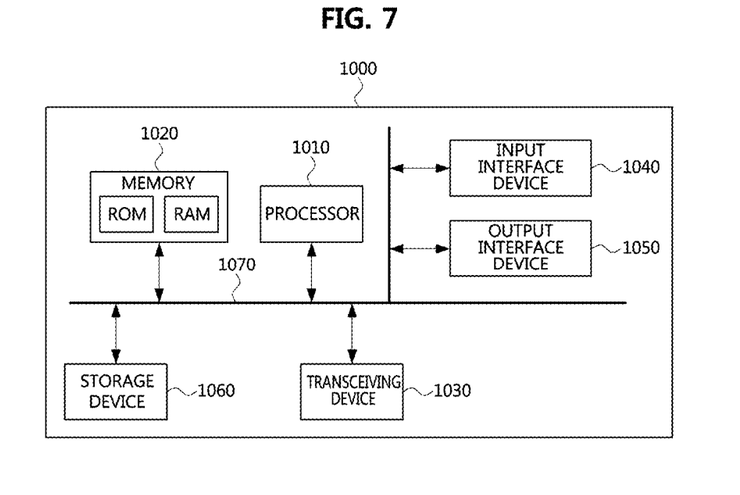
FIG. 7 is a block diagram of a multi-object tracking apparatus according to an embodiment of the present invention.

FIG. 7 is a block diagram of a multi-object tracking apparatus according to an embodiment of the present invention.

Referring to FIG. 7, a multi-object tracking apparatus 1000 according to an embodiment of the present invention may include a processor 1010, a memory 1020 configured to store at least one command executable by the processor 1010 and a result of the execution of the command, and a transceiving device 1030 connected to a network and configured to perform communication.

Also, the multi-object tracking apparatus 1000 may further include an input interface device 1040, an output interface device 1050, and a storage device 1060. Elements included in the multi-object tracking apparatus 1000 may be connected to each other through a bus 1070 to communicate with each other.

The processor 1010 may execute a program command stored in at least one of the memory 1020 and the storage device 1060. The processor 1010 may refer to a central processing unit (CPU), a graphics processing unit (GPU), or a dedicated processor by which the methods according to embodiments of the present invention are performed. Each of the memory 1020 and a storage device 1060 may be composed of at least one of volatile storage media and non-volatile storage media. For example, the memory 1020 may be composed of at least one of a read-only memory (ROM) and a random-access memory (RAM).

Also, the storage device 1060 may store the location of the target object in a preceding frame and store a tracking trajectory of the target object. Also, the storage device 1060 may store reference features which are for similarity evaluation and which are extracted from the target object, the object candidate, and the tracking area and may store a result of the similarity evaluation.

Here, at least one command may include a command to set a tracking area in an input image, a command to extract at least one object candidate for a target object from the tracking area, a command to extract reference features for the target object, the object candidate, and the tracking area, a command to select two of the target object, the object candidate, and the tracking area to evaluate similarity based on the reference features, a command to allocate the object candidate to the target object on the basis of the evaluated similarity, and a command to track the target object on the basis of a location of the allocated object candidate.

Also, the command to extract reference features for the target object, the object candidate, and the tracking area may include a command to extract the reference features on the basis of a Siamese neural network structure including a plurality of identical neural networks.

Also, the plurality of identical neural networks may include a convolutional neural network (CNN) performing a convolutional operation.

Also, the CNN may include a fully convolutional network structure.

Also, the command to select two of the target object, the object candidate, and the tracking area to evaluate similarity on the basis of the reference features may include a command to evaluate similarity between the target object and the object candidate and calculate a similarity value.

Also, the command to select two of the target object, the object candidate, and the tracking area to evaluate similarity on the basis of the reference features may include a command to evaluate similarity between the target object and the tracking area and calculate a similarity map and a phase value of an object.

Also, the command to allocate the object candidate to the target object on the basis of the evaluated similarity may include a command to form a matrix on the basis of a similarity value obtained by evaluating the similarity between the target object and the object candidate and a command to allocate the object candidate to the target object by applying the Hungarian algorithm to maximize the sum of similarity values in the matrix formed on the basis of the similarity value.

Also, the command to allocate the object candidate to the target object on the basis of the evaluated similarity may include a command to allocate, to the target object, an object candidate corresponding to an area exhibiting the highest similarity to the target object in the similarity map.

Also, the command to track the target object on the basis of a location of the allocated object candidate may include a command to track the target object by applying a phase value of an object corresponding to the location of the allocated object candidate to the target object.

Also, the command may further include a command to train the integrated similarity neural network by inputting a location of the target object, which is changed in consideration of a result of the tracking, to the integrated similarity neural network.

The operations of the method according to an embodiment of the present invention can also be embodied as computer-readable programs or codes on a computer-readable recording medium. The computer-readable recording medium is any type of recording apparatus for storing data readable by a computer system. The computer-readable recording medium can also be distributed over network-coupled computer systems so that computer-readable programs or codes are stored and executed in a distributed fashion.

Also, examples of the computer-readable recording medium may include a hardware device such as ROM, RAM, and flash memory, which are specifically configured to store and execute program commands. The program commands may include high-level language codes executable by a computer using an interpreter as well as machine codes made by a compiler.

Although some aspects of the invention have been described in the context of an apparatus, it is clear that these aspects also represent a description of the corresponding method, where a block or device corresponds to a method step or a feature of a method step. Analogously, aspects described in the context of a method step may also represent a description of a corresponding block or item or feature of a corresponding apparatus. Some or all of the method steps may be performed by means of (or by using) a hardware device such as, for example, a microprocessor, a programmable computer, or an electronic circuit. In some embodiments, one or more of the most important method steps may be performed by such a device.

In some embodiments, a programmable logic device (for example, a field-programmable gate array) may be used to perform some or all of the functionalities of the methods described herein. In some embodiments, a field-programmable gate array may cooperate with a microprocessor in order to perform one of the methods described herein. Generally, the methods are performed by any hardware device.

According to embodiments of the present invention, by using one integrated similarity neural network, it is possible to complement the detection result obtained through single-tracking.

Also, according to embodiments of the present invention, by performing both of similarity evaluation between object candidates and object candidate allocation, it is possible to improve tracking performance.

Also, according to embodiments of the present invention, by training an integrated similarity neural network in an integrated manner, it is possible to increase training efficiency.

While the present invention has been described with reference to exemplary embodiments, it will be understood by those skilled in the art that variations and modifications of the invention may be made without departing from the spirit and scope of the invention as defined by the appended claims.

What is claimed is:

1. A method of tracking multiple objects included in an image using a multi-object tracking apparatus including an integrated similarity neural network, the method comprising:
    setting a tracking area in an input image;
    extracting at least one object candidate for a target object from the tracking area;
    extracting reference features for the target object, the object candidate, and the tracking area;
    evaluating similarity between the target object and the object candidate by calculating a similarity value based on the reference features using the integrated similarity neural network;
    evaluating similarity between the target object and the tracking area by calculating a similarity map and a phase value of an object based on the reference features using the integrated similarity neural network;
    allocating the object candidate to the target object on the basis of the evaluated similarity; and
    tracking the target object on the basis of a location of the allocated object candidate,
    wherein both of the evaluating similarity between the target object and the object candidate and the evaluating similarity between the target object and the tracking area are being performed together in the integrated similarity neural network.

2. The method of claim 1, wherein the extracting of the reference features for the target object, the object candidate, and the tracking area comprises extracting the reference features on the basis of a Siamese neural network structure including a plurality of identical neural networks.

3. The method of claim 2, wherein the plurality of identical neural networks include a convolutional neural network (CNN) performing a convolutional operation.

4. The method of claim 3, wherein the CNN includes a fully convolutional network structure.

5. The method of claim 1, wherein the allocating of the object candidate to the target object on the basis of the evaluated similarity comprises:
    forming a matrix on the basis of a similarity value obtained by evaluating the similarity between the target object and the object candidate; and
    allocating the object candidate to the target object by applying the Hungarian algorithm to maximize a sum of similarity values in the matrix.

6. The method of claim 1, wherein the allocating of the object candidate to the target object on the basis of the evaluated similarity comprises allocating, to the target object, an object candidate corresponding to an area exhibiting the highest similarity to the target object in a similarity map.

7. The method of claim 1, wherein the tracking of the target object on the basis of the location of the allocated object candidate comprises tracking the target object by applying a phase value of an object corresponding to the location of the allocated object candidate to the target object.

8. The method of claim 1, further comprising training the integrated similarity neural network by inputting a location of the target object, which is changed in consideration of a result of the tracking, to the integrated similarity neural network.

9. A multi-object tracking apparatus, comprising:
    a processor; and
    a memory configured to store at least one command executable by the processor,
    wherein the command comprises:
        a command to set a tracking area in an input image;
        a command to extract at least one object candidate for a target object from the tracking area;
        a command to extract reference features for the target object, the object candidate, and the tracking area;
        a command to evaluate similarity between the target object and the object candidate by calculating a similarity value based on the reference features using an integrated similarity neural network;
        a command to evaluate similarity between the target object and the tracking area by calculating a similarity map and a phase value of an object based on the reference features using the integrated similarity neural network;
        a command to allocate the object candidate to the target object on the basis of the evaluated similarity; and
        a command to track the target object on the basis of a location of the allocated object candidate, and
    wherein both of the command to evaluate similarity between the target object and the object candidate and the command to evaluate similarity between the target object and the tracking area are for being performed together in the integrated similarity neural network.

10. The multi-object tracking apparatus of claim 9, wherein the command to extract the reference features for the target object, the object candidate, and the tracking area comprises a command to extract the reference features on the basis of a Siamese neural network structure including a plurality of identical neural networks.

11. The multi-object tracking apparatus of claim 10, wherein the plurality of identical neural networks include a convolutional neural network (CNN) performing a convolutional operation.

12. The multi-object tracking apparatus of claim 11, wherein the CNN includes a fully convolutional network structure.

13. The multi-object tracking apparatus of claim 9, wherein the command to allocate the object candidate to the target object on the basis of the evaluated similarity comprises:
    a command to form a matrix on the basis of a similarity value obtained by evaluating the similarity between the target object and the object candidate; and
    a command to allocate the object candidate to the target object by applying the Hungarian algorithm to maximize a sum of similarity values in the matrix.

14. The multi-object tracking apparatus of claim 9, wherein the command to allocate the object candidate to the target object on the basis of the evaluated similarity comprises a command to allocate, to the target object, an object candidate corresponding to an area exhibiting the highest similarity to the target object in a similarity map.

15. The multi-object tracking apparatus of claim 9, wherein the command to track the target object on the basis of the location of the allocated object candidate comprises a command to track the target object by applying a phase value of an object corresponding to the location of the allocated object candidate to the target object.

16. The multi-object tracking apparatus of claim 9, wherein the command further comprises a command to train the integrated similarity neural network by inputting a location of the target object, which is changed in consideration of a result of the tracking, to the integrated similarity neural network.

\* \* \* \* \*